(No Model.)
J. F. HYLAN & R. L. SINLEY.
BICYCLE WHISTLE.
No. 508,318. Patented Nov. 7, 1893.
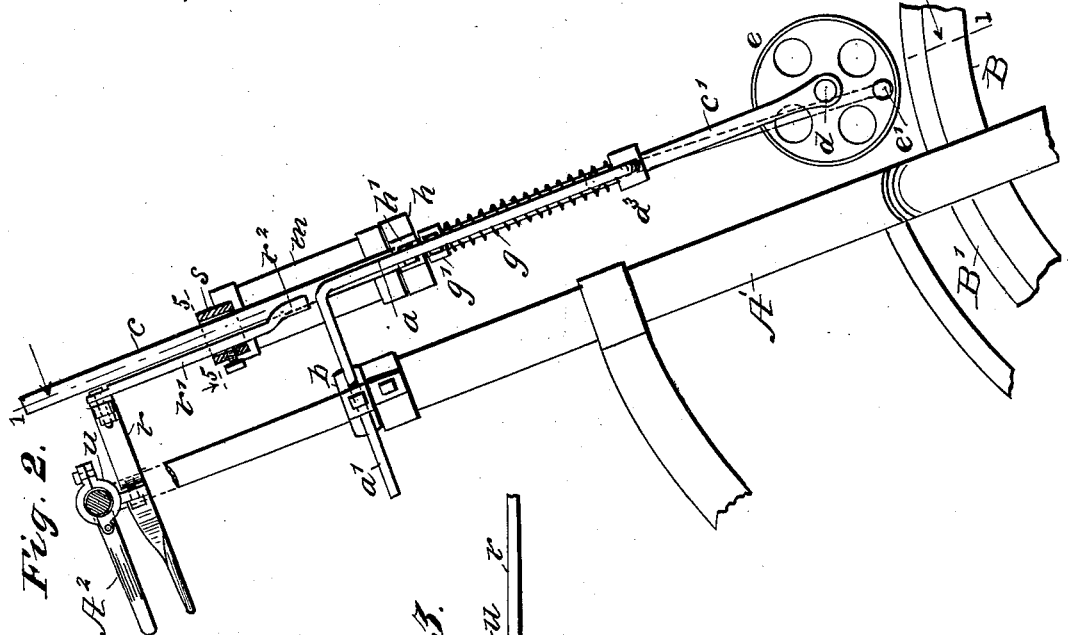
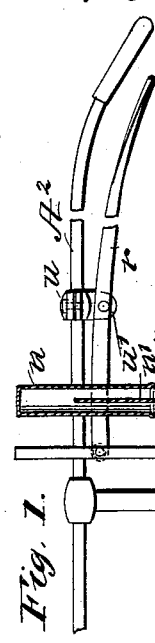
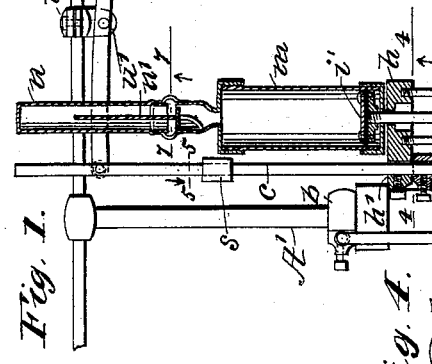
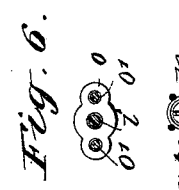
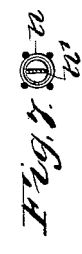
WITNESSES:
F. McArdle
C. Sedgwick
INVENTORS
J. F. Hylan
BY R. L. Sinley
Munn & Co
ATTORNEYS.

UNITED STATES PATENT OFFICE.

JOHN F. HYLAN AND ROBERT L. SINLEY, OF BROOKLYN, NEW YORK.

BICYCLE-WHISTLE.

SPECIFICATION forming part of Letters Patent No. 508,318, dated November 7, 1893.

Application filed December 3, 1892. Serial No. 453,922. (No model.)

*To all whom it may concern:*

Be it known that we, JOHN F. HYLAN and ROBERT L. SINLEY, both of Brooklyn, in the county of Kings and State of New York, have invented a new and useful Bicycle-Whistle, of which the following is a full, clear, and exact description.

Ordinarily the riders of bicycles and like vehicles carry a whistle with which to sound an alarm signal, as a warning to pedestrians, while in motion on a thoroughfare. In use, the common whistle is applied to the mouth, and requires a full blast of air from the lungs of the user, to produce a sound of sufficient volume for signaling purposes. If the rider is speeding his bicycle, the exertion of muscular power to effect such a rapid motion, consumes in a large degree his strength and lung power, so that the additional strain on his lungs required to blow a loud blast on the whistle, proves very laborious and exhausting.

The object of our invention is, to provide a novel, simple, and practical device, having an air pump, that may be easily attached to bicycles of the "safety" type, and be actuated by the rotary motion of the front wheel of the bicycle, so as to provide a copious supply of air, and blow a loud blast on the whistle connected to the air pump as long as desired, when the rider manipulates a part of the device to effect such a result.

To this end, our invention consists in the construction and combination of parts, as is hereinafter described and claimed.

Reference is to be had to the accompanying drawings, forming a part of this specification, in which similar letters of reference indicate corresponding parts in all the figures.

Figure 1 is a partly sectional, front view of the upper portion of a safety bicycle, and the novel whistle mechanism attached thereto, the section being taken on the line 1—1 in Fig. 2. Fig. 2 is a side view opposite the arrow 2 in Fig. 1. Fig. 3 is a plan view, in part, of the whistle device and the front portion of the bicycle. Fig. 4 is a reverse plan view, on the line 4—4 in Fig. 1. Fig. 5 is a sectional plan view on the line 5—5 in Figs. 1 and 2. Fig. 6 is a sectional plan view on the line 6—6 in Fig. 1; and Fig. 7 is a reverse plan view in section on the line 7—7 in Fig. 1.

In the drawings, A represents the front frame fork of the bicycle whereon the novel whistle mechanism is supported, it being detachably secured on the inclined fork standard A', that passes upwardly through the sleeve portion of the fork. To avoid a confusion of parts, the usual brake mechanism for the bicycle is removed, it being intended to locate it between the standard and main portion of the whistle device. The latter, briefly stated, consists of a whistle mounted upon the upper end of an air pump barrel, secured to an upright reciprocating rod held to slide vertically, by an arm which hangs parallel with the sliding rod, and is secured upon the fork standard. The lower end portion of the reciprocating rod supports a laterally-projected journal stud, whereon a crank wheel is rotatably secured. Said wheel has a lateral crank pin, to which the plunger of the air pump is loosely connected; a depression of the crank wheel to cause its frictional contact with the tire of the front wheel of the bicycle, being produced by a vibratable lever, pivoted on the handle-bar of the bicycle, so that a manipulation of the lever will cause a rapid rotation of the crank wheel, and project a current of air from the pump barrel through the whistle.

The hanger arm $a$, is in L-form, its lateral member $a'$, that is at the top, projecting through a clamping box $b$, which is slid upon the standard A', at a proper point and secured thereto by a set screw, the limb of the hanger arm that is inserted through a hole in the clamping box from its front side, being likewise held by a set screw in the box, so as to be adjusted on the same, to locate its pendent portion at a proper distance in advance of the fork sleeve. On the lower end of the hanger arm $a$, a lateral limb $a^2$ is formed, and is by preference projected toward the left side of the bicycle a sufficient length to adapt its vertically perforated hubbed end $a^3$, to receive the vertical reciprocating rod $c$.

The length of the rod $c$ is so proportioned, that it will extend from the handle-bar A², to a point near the lower end of the limbs of the frame fork, and as shown in Fig. 1, the lower portion of the vertical rod $c$ is curved laterally and downwardly a proper degree toward the right side of the bicycle frame fork A, to adapt said rod portion $c'$ to afford a proper support for the journal stud $d$, which has one end secured to the lower terminal of the rod $c$, and projects to the left side of the bicycle, having a sufficient length to afford a rotatable support for the crank wheel $e$, which is of a diameter that will permit the crank pin $e'$, which is projected from its right side near its periphery to have a proper throw. The crank wheel $e$, has its periphery grooved, as shown in Fig. 1, so as to adapt it to fit upon the face of the cylindrical tire $B'$ on the wheel rim $B$, and by frictional contact therewith receive rotary motion when the bicycle is in use.

Upon the reciprocating rod $c$, a spiral spring $g$ is located, and is seated upon the boss or hub $a^3$ of the hanger arm $a$, its upper end being pressed upon by the adjustable block $g'$, that is perforated to slide on the rod $c$, and is furnished with a clamping screw that retains the block at a proper point on the part it encircles, said spring being designed to normally press the block $g'$ and rod $c$ upwardly. On the rod $c$, a head block $h$ is mounted. This consists of a circular edged piece that is flat on the upper side, and having a lug $h'$ projected from the edge, which lug is perforated at a right angle to the top face of the block, of a diameter to loosely fit upon the rod it engages, and to which it is secured at a desired point above the block $g'$, by a set screw.

The head block $h$, is centrally perforated to receive the plunger rod $i$, of the plunger head $i'$, which latter is adapted to slide in the vertical barrel $m$, of the air pump, said barrel being seated upon and secured to the upper face of the head block. A sufficient diameter and length is given to the cylindrical air pump barrel $m$, to afford a proper volume of air for the whistle $n$, that is attached by its lower end to the top wall of the barrel, and projects vertically and centrally from it. The whistle $n$, consists of a tubular piece closed at the top, and apertured on its side for the introduction of air near the lower end, the latter being contracted in diameter where it is introduced in and through the top wall of the air pump barrel $m$.

The usual flat tongue piece $n'$, is furnished for the whistle, which tongue projects vertically and centrally within the shell of the whistle, of a proper length for effective service, the lower end being bent laterally and secured to the side of the whistle shell or body near its base, the tongue being free to vibrate throughout its length when agitated by a current of air that is forced from the barrel $m$, into the whistle shell and across the free end of the tongue, in the ordinary manner.

The lower end of the plunger rod $i$ is centrally secured in the upper portion of a crosshead $o$, wherein two perforations of equal diameter are oppositely formed, at an equal distance from the plunger rod. Two guide rods $o'$ are secured diametrically opposite the perforations of the head block $h$, so as to depend in parallel planes, their axial planes being equally distant from the center of the plunger rod, and also equal to the distance of the holes in the cross-head $o$ from its center, so that the rods will slide loosely in the top flange of the cross-head. The depending portion of the cross-head $o$, is axially slotted from its lower end a proper distance, to loosely engage with the upper end of the pitman rod $p$ pivoted in said slot, as shown in Fig. 1. A suitable curvature is given to the lower portion of the pitman rod, to adapt it to lie closely to the crank pin $e'$, on which it is loosely secured in the usual manner.

A lever $r$, of proper length, is provided to longitudinally move the rod $c$, when the whistle is to be sounded, the end of said lever nearest to the rod named being jointed to the upper end of a connecting bar $r'$, which extends downwardly of a suitable length, and has a curved pad $r^2$ formed on its lower terminal, which pad has a concave face that bears upon the cylindrical rod $c$. The rod and the connecting bar are held together by the clamping box $s$, that loosely embraces both these pieces, and has a set screw provided for it, which affords means to clamp the bar on the rod at any point on the latter that may be required to properly locate the lever below the handle-bar $A^2$, of the bicycle. On the left hand portion of the handle bar $A^2$, a clamping box $u$ is adjustably secured, from which depends an ear $u'$, whereon the lever $r$ is pivoted to vibrate vertically.

In Fig. 3, the handle bar $A^2$, has been removed, to show the lever and its means of attachment upon the rod $c$, and as indicated in this view, the lever is bent rearwardly at $r^3$, and then outwardly at $r^4$, to project the main portion of the lever below the handle bar portion, so that the rider, by gripping both these pieces, can vibrate the other end downwardly, so as to depress the wheel $e$, and enforce its frictional contact with the tire $B'$, when the latter is revolving rapidly, thereby causing the pump plunger head $i'$ to be reciprocated by its connection with said crank wheel, and the whistle to be sounded loudly for as long a time as the lever is held in the position mentioned.

It has been stated that by preference the lever $r$ is projected toward the left side of the bicycle, below the handle bar $A^2$; this is so arranged to allow a place for the lever of the ordinary brake rigging, which is usually placed below the handle-bar at the right side of the bicycle, and it is evident that if preferred, the relative positions of these levers may be changed without affecting the efficiency of either of them.

From the construction and relative arrangement of the several parts of the novel whistle mechanism, it will be seen that an attachment of the entire device can be made upon "safety" bicycles of any style, as all are provided with a fork standard, and a front wheel $B$, pivoted on the fork of said standard.

Having thus described our invention, we claim as new and desire to secure by Letters Patent—

1. The combination with the front frame fork of a bicycle, the fork standard, and the front wheel of the bicycle, of a cylindrical air pump barrel, a whistle thereon that receives air from the pump, a plunger and its rod in the barrel, a vertical rod supported to reciprocate on the fork standard, a spring thereon, a rotatable crank wheel on said rod, and a laterally extended lever jointed to the rod, and pivoted on a block below the handle-bar of the bicycle, substantially as described.

2. The combination with the front frame fork of a bicycle, its standard, the front wheel of the bicycle, a hanger arm pendent from the standard, a vertical reciprocating rod loosely engaging the hanger arm, an adjustable block on the vertical rod, a spiral spring thereon between the hanger arm and said block, and a lever pivoted by one end to the rod and vibratable below the handle bar of the bicycle, of a whistle, an air pump therefor, a rotatable crank wheel pivoted on the vertical reciprocating rod, and devices connected to the crank wheel by a pin and adapted to work the pump when the crank wheel has contact with the rotating bicycle wheel, substantially as described.

JOHN F. HYLAN.
ROBT. L. SINLEY.

Witnesses:
JNO. H. BURTIS,
RUSSELL RANDOLPH.